(12) United States Patent
Usui (10) Patent No.: US 7,791,306 B2
(45) Date of Patent: Sep. 7, 2010

(54) APPARATUS, METHOD, AND SYSTEM FOR CONTROLLING STEPPING MOTOR

(75) Inventor: Minoru Usui, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 259 days.

(21) Appl. No.: 11/892,841

(22) Filed: Aug. 28, 2007

(65) Prior Publication Data

US 2008/0079384 A1     Apr. 3, 2008

(30) Foreign Application Priority Data

Sep. 29, 2006   (JP)   ............................. 2006-269854

(51) Int. Cl.
*H02P 8/00* (2006.01)
(52) U.S. Cl. ...................... 318/685; 318/696
(58) Field of Classification Search ................. 318/685, 318/696
See application file for complete search history.

(56) References Cited

U.S. PATENT DOCUMENTS

| | | | | |
|---|---|---|---|---|
| 4,906,910 A | * | 3/1990 | Tanuma et al. | ............... 318/696 |
| 5,440,214 A | * | 8/1995 | Peeters | ....................... 318/685 |
| 6,509,709 B2 | * | 1/2003 | Kubozuka et al. | ........... 318/685 |
| 7,339,342 B2 | * | 3/2008 | Harada et al. | ............... 318/685 |
| 7,352,150 B2 | * | 4/2008 | Fujinaka et al. | ............. 318/685 |

FOREIGN PATENT DOCUMENTS

| | | |
|---|---|---|
| JP | 06-178595 | 6/1994 |
| JP | 07-322696 | 12/1995 |
| JP | 09-065693 | 3/1997 |

\* cited by examiner

*Primary Examiner*—Bentsu Ro
*Assistant Examiner*—David S Luo
(74) *Attorney, Agent, or Firm*—Fujitsu Patent Center (57) ABSTRACT

A stepping motor controller that alleviates the CPU burden of motor control tasks. An acceleration control starter initializes a pointer register with a given start angle address upon receipt of a control start signal. Duty cycles for different motor angles are previously calculated and stored in a duty cycle memory. A duty cycle selector looks up this memory to select specific duty cycles corresponding to the angle address held in the pointer register. The stepping motor is driven with pulse signals that a pulse generator produces according to the selected duty cycles. An angle address calculator adds a given address increment to the pointer register. A revolution detector detects one revolution of the stepping motor by comparing the angle address of the pointer register with an end angle address, which permits an acceleration constant calculator to change the angular increment upon detection of one revolution.

9 Claims, 6 Drawing Sheets

APPARATUS, METHOD, AND SYSTEM FOR CONTROLLING STEPPING MOTOR

CROSS-REFERENCE TO RELATED APPLICATIONS

This application is based upon and claims the benefits of priority from the prior Japanese Patent Application No. 2006-269854 filed on Sep. 29, 2006, the entire contents of which are incorporated herein by reference.

BACKGROUND OF THE INVENTION

1. Field of the Invention

The present invention relates to an apparatus, method, and system for controlling a stepping motor. More particularly, the present invention relates to a stepping motor controller, method, and system that drive a stepping motor in accordance with given command signals.

2. Description of the Related Art

Stepping motors, also known as step motors or stepper motors, are used in a wide range of applications such as laser printers, digital copiers, and industrial robots. Those devices take advantage of high rotational accuracy of stepping motors.

Figure 4:
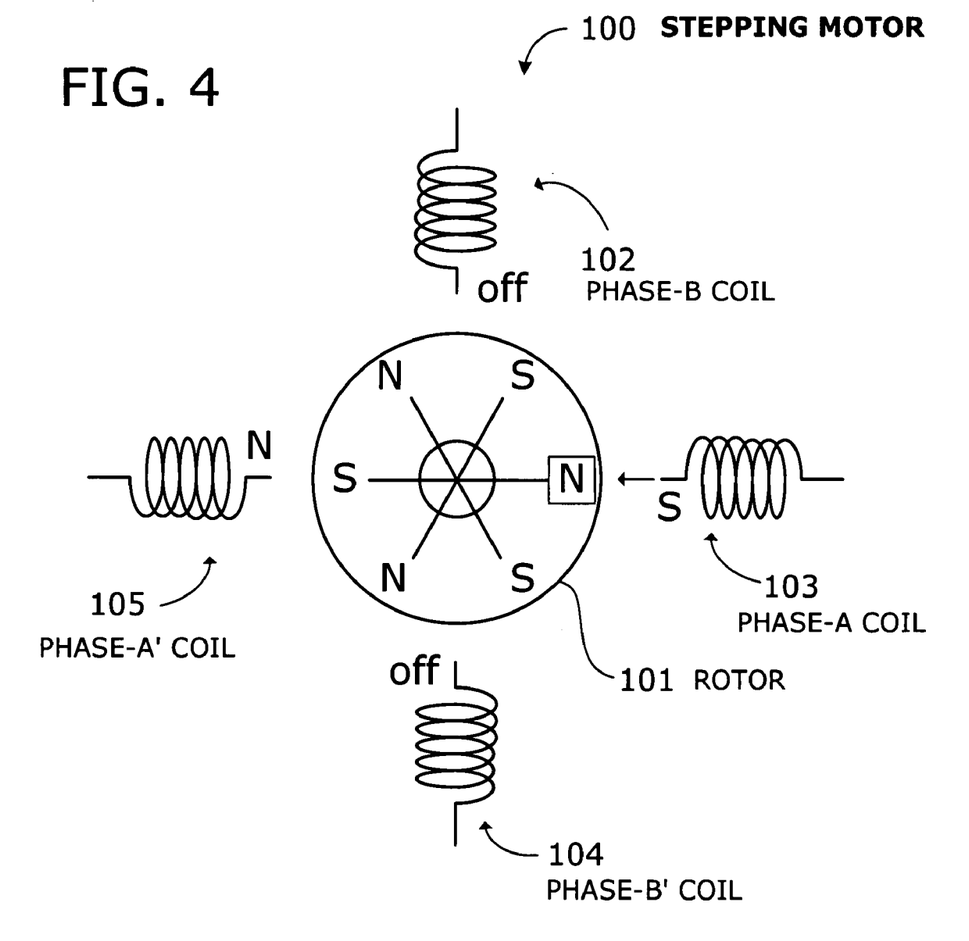
FIGS. 4 to 6 show a simplified model of a stepping motor to give an overview of how a typical stepping motor operates.
Figure 5:
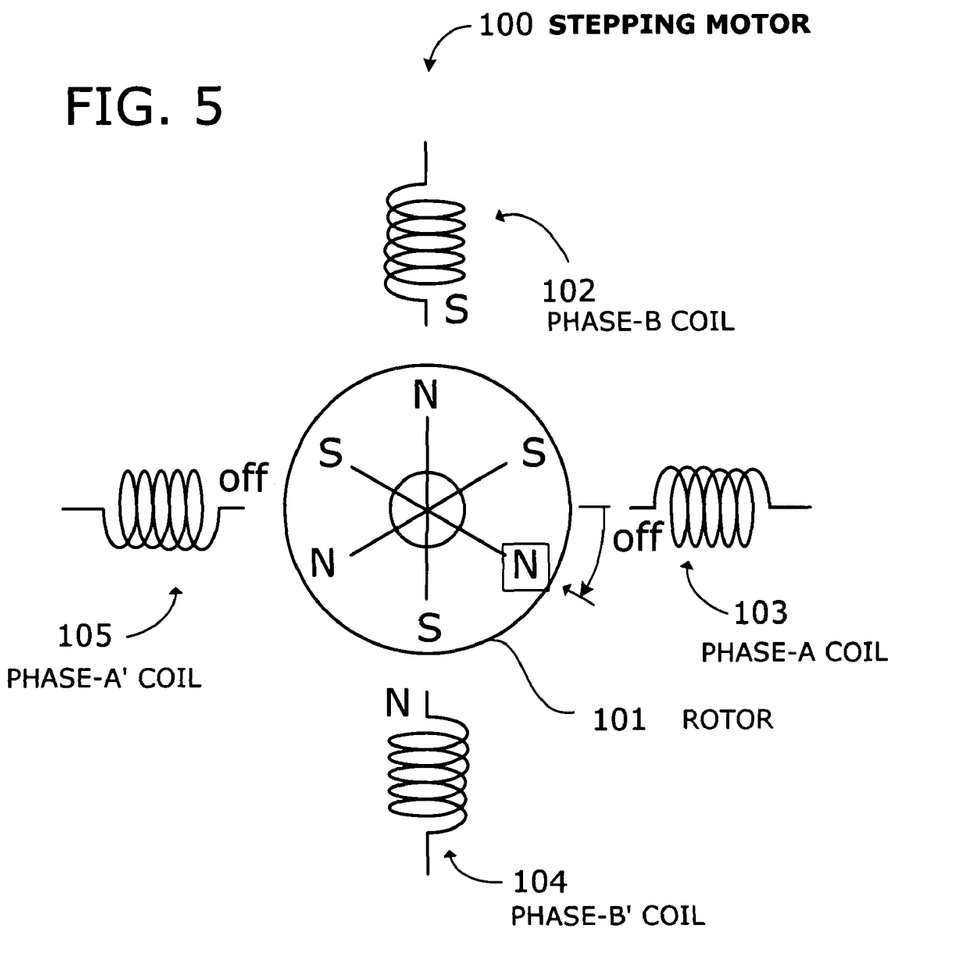
Figure 6:
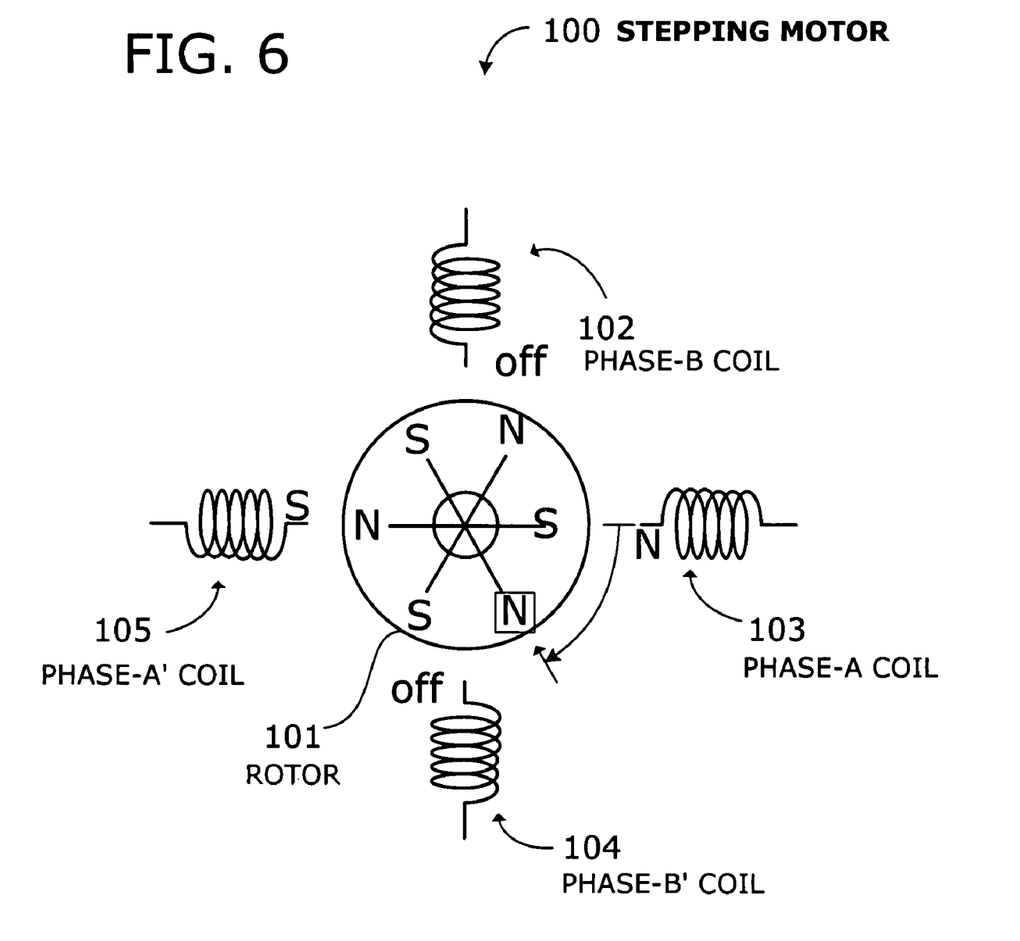

FIGS. 4 to 6 show a simplified model of a stepping motor to give an overview of how a typical stepping motor works. The illustrated stepping motor 100 has a rotor 101 in its central position, with north (N) and south (S) poles arranged alternately. This rotor 101 is surrounded by stator coils including a phase-B coil 102, a phase-A coil 103, a phase-B' coil 104, and a phase-A' coil 105. The magnetic poles of the stator coils can be controlled electrically by varying the voltages applied to (or the currents flowing through) those coils 102 to 105.

Specifically, FIG. 4 shows a state where the phase-A coil 103 and phase-A' coil 105 create S and N poles, respectively, while the other coils 102 and 104 are not energized. The S pole of the phase-A coil 103 attracts an N pole of the rotor 101, while the N pole of the phase-A' coil 105 attracts an S pole of the rotor 101. FIG. 5 then shows a subsequent state of the stepping motor 100, in which the stator poles are changed such that the phase-B coil 102 and phase-B' coil 104 produce S and N poles, respectively, while the phase-A coil 103 and phase-A' coil 105 are de-energized. This change causes the rotor 101 to turn clockwise by 30 degrees. FIG. 6 shows another 30-degree rotation of the rotor 101. This is accomplished by exciting the phase-A coil 103 and phase-A' coil 105 to create N and S poles, respectively, while de-energizing the other two coils 102 and 104. As can be seen from FIGS. 4 to 6, the stator poles are varied successively by switching the current of motor coils, attracting the corresponding rotor poles and thereby turning the rotor 101 continuously. Stepping motors generally operate in this way.

A motor driver circuit (not shown) is designed to drive such a stepping motor in accordance with some command signals generated by, for example, a central processing unit (CPU). That is, the CPU is used to produce appropriate pulse signals to control the rotation speed and angle of the stepping motor. The driver circuit controls the pattern of energizing motor coils according to the given pulse signals, thus running the motor. A desired rotation speed and angular position can be obtained in this case by controlling the frequency and the number of pulses given to the driver circuit.

Such a CPU-based stepping motor control system can also subdivide each main step (e.g., 90 degrees in the example of FIGS. 4 to 6) into smaller steps by varying the pulse width modulation (PWM) duty cycle of motor coil current of each pole. That is, the use of a CPU in coil current control makes it possible to increase the angle resolution by several to several ten times, thus enabling smooth and accurate rotation of the rotor.

Conventional systems control the rotation speed and angle of a stepping motor according to control signals produced by a CPU. However, recent years have seen an increased demand for more accurate rotation control as the application of stepping motors expands to the high-performance market. This means that the motor control CPU has to deal with a higher load of control tasks, which leads to a circuit design using a special CPU that is dedicated to stepping motor control. See, for example, Japanese Patent Application Publication No. 7-322696 (1995).

The conventional CPU-based motor control, however, has a drawback. Specifically, think of what the CPU needs to do in a stepping motor system to achieve a single revolution of the output axis. The number of control commands for one revolution is calculated as a product of the number of rotor poles and the number of steps. This number may be further multiplied by the reduction factor in the case where a reduction mechanism is involved. Suppose, for example, that the rotor has six poles, the pole interval is divided into sixteen steps, and the reduction ratio is 1/24. In this case, the number of control commands that the CPU has to generate for a single revolution will amount to 2304(=6×16×24). In addition to generating those current control commands, the CPU has to perform calculation for acceleration and deceleration to start and stop the motor smoothly. As can be seen from the above, a large processing burden is imposed on the motor control CPU in a conventional stepping motor controller. This is also true in the above-mentioned Japanese Patent Application Publication No. 7-322696 since it has to transfer a set of energizing pattern data for each single command pulse.

SUMMARY OF THE INVENTION

In view of the foregoing, it is an object of the present invention to provide an apparatus, method, and system for controlling a stepping motor with a reduced processing burden on the CPU.

To accomplish the above object, the present invention provides an apparatus for controlling a stepping motor. This apparatus includes an angle address register storing a start angle address representing a start angle of the stepping motor, as well as an end angle address representing an end angle of the stepping motor. The apparatus also has a pointer register holding an angle address representing a rotation angle of the stepping motor. Duty cycles corresponding to different angle addresses including the start angle address stored in the angle address register are calculated previously and stored in a duty cycle memory. An acceleration control starter initializes the pointer register with the start angle address stored in the angle address register upon receipt of a control start signal. Then a duty cycle selector looks up the duty cycle memory to select specific duty cycles corresponding to the angle address held in the pointer register. Pulse signals having the selected duty cycles are produced by a pulse generator to drive the stepping motor. An angle address calculator updates the pointer register with a new angle address calculated by adding a given address increment to the angle address held in the pointer register. A revolution detector, on the other hand, detects one revolution of the stepping motor by comparing the angle address of the pointer register with the end angle address, which permits an acceleration constant calculator to change the angular increment upon detection of one revolution.

To accomplish the above object, the present invention also provides a method of controlling a stepping motor. This method includes the following steps: (a) providing an angle address register storing a start angle address representing a start angle of the stepping motor, as well as an end angle address representing an end angle of the stepping motor; (b) providing a pointer register holding an angle address representing a rotation angle of the stepping motor; (c) providing a duty cycle memory storing duty cycles corresponding to different angle addresses including the start angle address stored in the angle address register; (d) initializing the pointer register with the start angle address stored in the angle address register upon receipt of a control start signal; (e) looking up the duty cycle memory to select duty cycles corresponding to the angle address held in the pointer register; (f) producing pulse signals to drive the stepping motor, according to the selected duty cycles; (g) updating the pointer register with a new angle address calculated by adding a given address increment to the angle address held in the pointer register; (h) detecting one revolution of the stepping motor by comparing the angle address of the pointer register with the end angle address; and (i) changing the angular increment upon detection of one revolution by the revolution detector.

Further, to accomplish the above object, the present invention provides a stepping motor control system. This system includes (a) a central processing unit (CPU) that produces a control start signal, (b) a stepping motor controller that produce pulse signals, and (c) a stepping motor driven with those pulse signals. The stepping motor controller is formed from the same elements as what are described above as an apparatus for controlling a stepping motor according to the present invention.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will now be described in detail below with reference to the accompanying drawings, wherein like reference numerals refer to like elements throughout. Before going into details, a specific example of CPU-based motor control will be discussed with reference to FIGS. 2 and 3.

Figure 2:
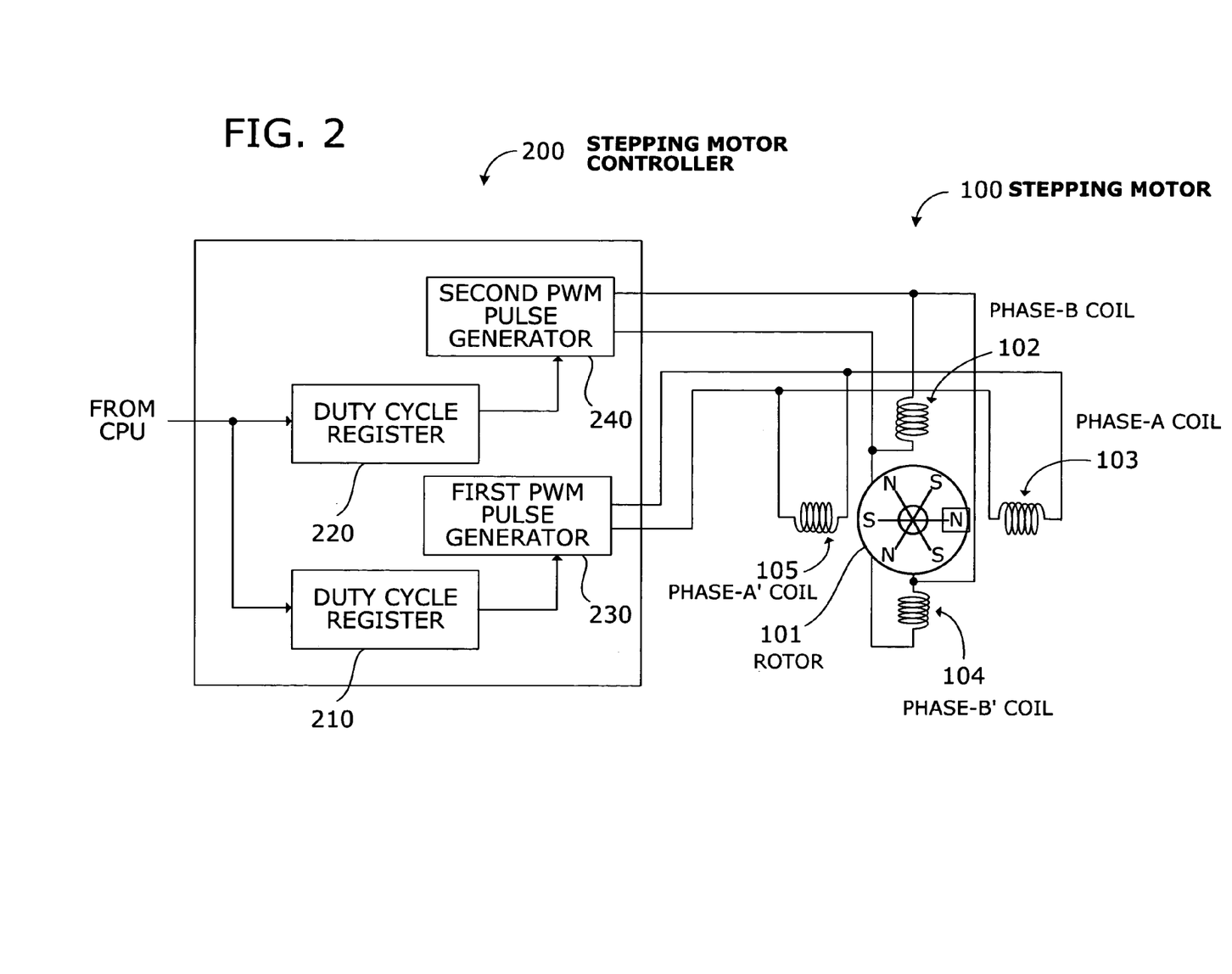
FIG. 2 is a block diagram of a stepping motor controller that drives a stepping motor with a given command signal.

FIG. 2 is a block diagram of a stepping motor controller that drives a stepping motor with given command signals. The illustrated stepping motor controller 200 includes duty cycle registers 210 and 220, a first PWM pulse generator 230, and a second PWM pulse generator 240, where PWM stands for pulse width modulation. Connected to the output end of this controller 200 is a stepping motor 100, which has a rotor 101 surrounded by a phase-A coil 103, a phase-A' coil 105, a phase-B coil 102, and a phase-B' coil 104 in the same way as discussed earlier in FIGS. 4 to 6. The stepping motor controller 200 drives the stepping motor 100 according to command signals given from a CPU.

The CPU calculates PWM duty cycles corresponding to each energizing pattern to rotate the stepping motor 100 and writes the result to the duty cycle registers 210 and 220. The first and second PWM pulse generators 230 and 240 take in those duty cycles from corresponding duty cycle registers 210 and 220. The first and second PWM pulse generators 230 and 240 produce pulse signals in accordance with the given duty cycles to drive the phase-A coil 103, phase-A' coil 105, phase-B coil 102, and phase-B' coil 104 through power driver circuits (not shown), thereby running the stepping motor 100. The CPU-based stepping motor controller 200 controls acceleration and deceleration of the stepping motor 100 in a desired way.

Figure 3:
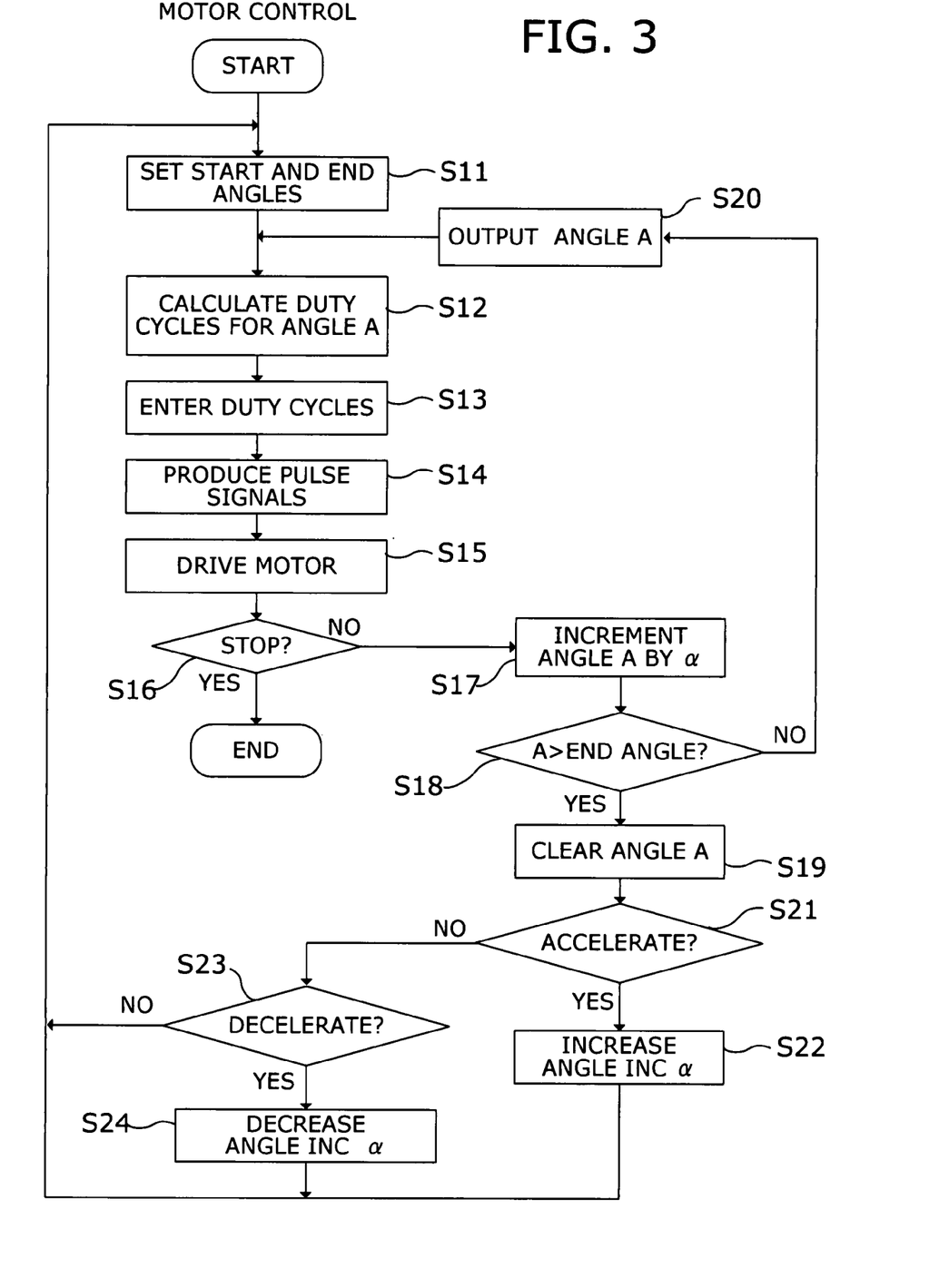
FIG. 3 is a flowchart showing how the CPU works with the stepping motor controller of FIG. 2.

Referring to the flowchart of FIG. 3, the CPU serves the above stepping motor controller 200 as follows. As already mentioned in the preceding paragraphs, the CPU calculates PWM duty cycles and writes them into the duty cycle register 210 and 220 so that the first and second PWM pulse generators 230 and 240 can produce modulated pulse signals to drive the stepping motor 100. The flowchart of FIG. 3 includes the following steps to achieve this control:

(Step S11) The CPU gives a start angle corresponding to a rotation start angle. The CPU also sets an end angle corresponding to a rotation end angle.

(Step S12) The CPU calculates duty cycles for the given angle and writes the result to the duty cycle registers 210 and 220.

(Step S13) The first and second PWM pulse generators 230 and 240 take in those duty cycles from the duty cycle registers 210 and 220, respectively.

(Step S14) The first and second PWM pulse generators 230 and 240 provides the stepping motor 100 with pulse signals having the given duty cycles.

(Step S15) The stepping motor 100 rotates according to the given pulse signals.

(Step S16) The CPU determines whether the stepping motor 100 is supposed to stop at the angle given by the pulse signals. If so, the present process is terminated. If the stepping motor 100 should continue running, the process advances to step S17.

(Step S17) The CPU adds an angular increment $\alpha$ to the current rotation angle, thereby calculating a new angle A.

(Step S18) The CPU compares the angle A with the specified end angle. If the former is smaller than the latter, the process advances to step S20. Otherwise, the process proceeds to step S19.

(Step S19) The CPU clears the angle A.

(Step S20) The CPU outputs the angle A.

(Step S21) The CPU determines whether to accelerate the stepping motor 100. If so, the process advances to step S22. If not, the process proceeds to step S23.

(Step S22) To accelerate, the CPU increases the angular increment $\alpha$ for use at step S17. The process then returns to step S11.

(Step S23) The CPU determines whether to decelerate the stepping motor 100. If so, the process advances to step S24. If not, the process returns to step S11.

(Step S24) To decelerate, the CPU decreases the angular increment $\alpha$ for use at step S17. The process then returns to step S11.

The CPU uses the duty cycle registers 210 and 220 and the first and second PWM pulse generators 230 and 240 in this way to control the stepping motor 100. As can be seen from the above example, most of the control tasks rely on the CPU. The present invention provides a less CPU-intensive stepping motor controller as will be described with reference to FIG. 1.

Figure 1:
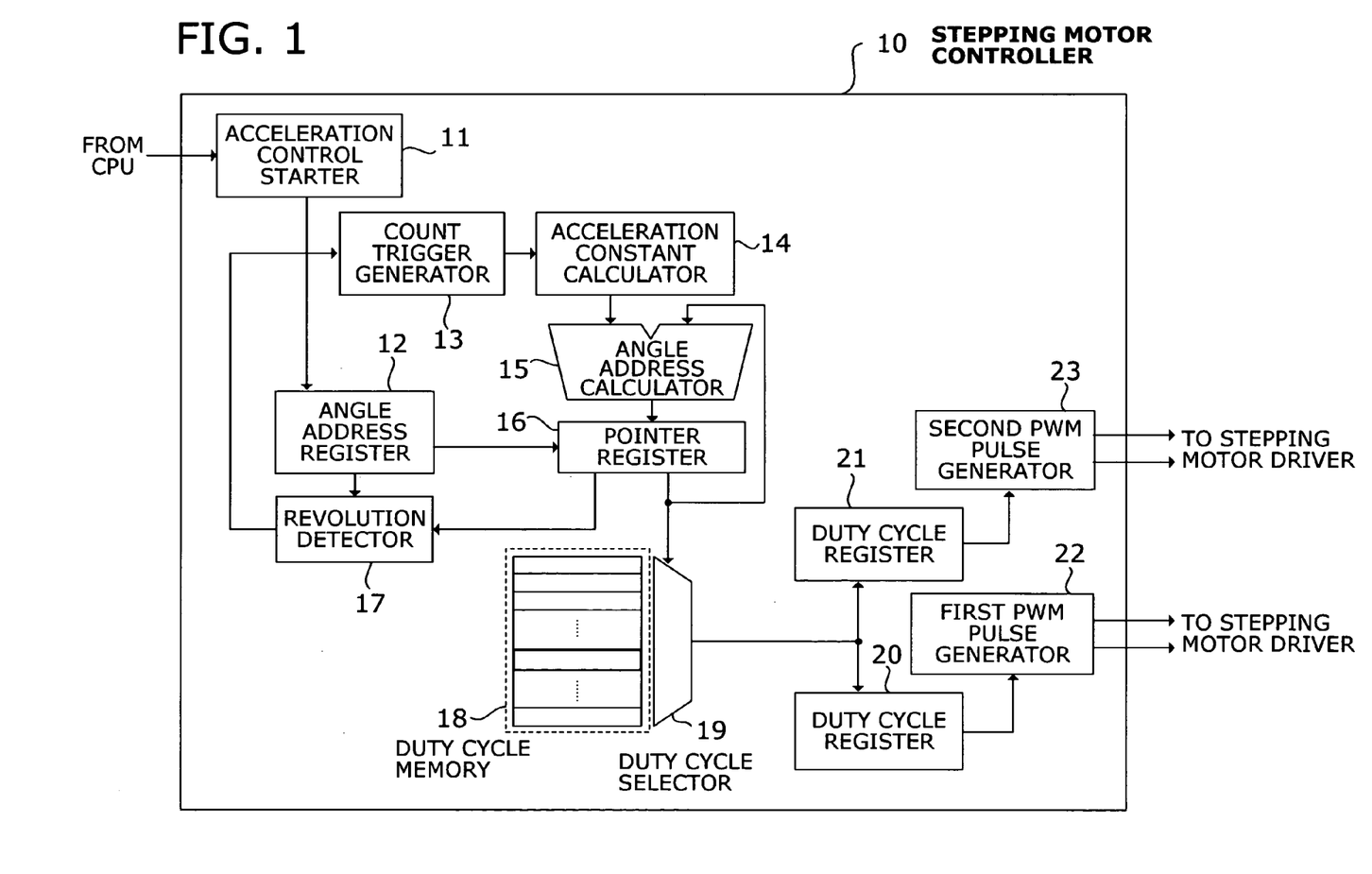
FIG. 1 is a block diagram of a stepping motor controller that drives a stepping motor with a given command signal according to an embodiment of the present invention.

FIG. 1 is a block diagram of a stepping motor controller that drives a stepping motor with a given command signal according to an embodiment of the present invention. The stepping motor controller 10 of FIG. 1 contains some hardware modules to provide motor control functions. According to the present embodiment, the CPU previously sets angle addresses for a start angle and an end angle and calculates duty cycles corresponding to each rotation angle in the range between the start and end angles. The calculated duty cycles are stored in corresponding angle addresses of a duty cycle memory 18.

The stepping motor controller 10 of FIG. 1 is formed from the following elements: duty cycle registers 20 and 21, a first PWM pulse generator 22, a second PWM pulse generator 23, an acceleration control starter 11, an angle address register 12, a count trigger generator 13, an acceleration constant calculator 14, an angle address calculator 15, a pointer register 16, a revolution detector 17, a duty cycle memory 18, and a duty cycle selector 19. Although not explicitly shown in FIG. 1, the stepping motor controller 10 operates with a CPU, a power driver circuit, and a stepping motor. Specifically, a power driver circuit (not shown) will be connected to the first PWM pulse generator 22 and second PWM pulse generator 23, and the motor coils are wired to the output of the power driver circuit. The acceleration control starter 11 in the stepping motor controller 10 is coupled to the CPU to receive some signals.

With a control start signal given from the CPU, the stepping motor controller 10 begins to drive the stepping motor. As mentioned above, the CPU has previously set angle addresses for a start angle and an end angle and calculated duty cycles corresponding to each rotation angle in the duty cycle memory 18.

Each element of the stepping motor controller 10 shown in FIG. 1 provides the following functions. First, the acceleration control starter 11 is responsive to a control start signal given from the CPU. Upon reception, the acceleration control starter 11 initializes the pointer register 16 with a start angle address given in the angle address register 12, thus setting the start angle of the stepping motor. The acceleration control starter 11 also signifies completion of motor rotation by sending a signal back to the CPU.

The angle address register 12 stores the start angle address, which the CPU has previously set. The angle address register 12 also stores an end angle address given by the CPU.

The count trigger generator 13 produces a trigger signal for the acceleration constant calculator 14 in response to a detection signal from a revolution detector 17 (described later). With the trigger signal received from the count trigger generator 13, the acceleration constant calculator 14 increases or decreases the angular increment that will be used to update the current rotation angle of the stepping motor. The acceleration constant calculator 14 sends this new increment to the angle address calculator 15. As mentioned earlier, acceleration or deceleration of the stepping motor is achieved by increasing or decreasing the angular increment. The acceleration constant calculator 14 also has the function of initializing the current rotation angle.

The angle address calculator 15 receives an angular increment from the acceleration constant calculator 14, as well as an angle address from a pointer register 16 (described later). The angle address calculator 15 adds the former to the latter and outputs the resultant angle address back to the pointer register 16.

The pointer register 16 holds an angle address representing a rotation angle of the stepping motor. While it initially receives a start angle address from the angle address register 12, the pointer register 16 is updated with an angle address received from the angle address calculator 15 afterwards.

The revolution detector 17 detects a single rotation of the stepping motor from the angle address of the pointer register 16 and the end angle address. The detection result is sent to the count trigger generator 13.

The duty cycle memory 18 holds duty cycles corresponding to different angle addresses, which are previously written by the CPU. The duty cycle selector 19 looks up the duty cycle memory 18 to select specific duty cycles corresponding to the angle address given from the pointer register 16. The duty cycle selector 19 writes the selected duty cycles into the duty cycle registers 20 and 21. The duty cycle registers 20 and 21 serve as storage for those PWM duty cycles. The first PWM pulse generator 22 and second PWM pulse generator 23 produce pulse signals according to the duty cycles given in the corresponding duty cycle registers 20 and 21 and output them to drive the stepping motor.

With the above-described elements, the stepping motor controller 10 operates as follows. First, the CPU stores duty cycles corresponding to each rotation angle in the duty cycle memory 18, besides setting angle addresses for a start angle A and an end angle Z to the angle address register 12. The CPU sends a start command signal to the acceleration control starter 11, thereby initiating a motor control process. That is all the CPU needs to do for the stepping motor controller 10. The rest of the control process will be executed by the elements of the stepping motor controller 10.

Upon receipt of a start command signal from the CPU, the acceleration control starter 11 causes the angle address register 12 to send its stored angle address for the start address A to the pointer register 16. The duty cycle selector 19 uses this angle address in the pointer register 16 to retrieve duty cycles corresponding to the start angle A from the duty cycle memory 18. The duty cycle selector 19 writes the obtained duty cycles into the duty cycle registers 20 and 21. Each of the first PWM pulse generator 22 and second PWM pulse generator 23 produces a pulse signal with the given duty cycle and with a predetermined frequency. Those pulse signals drive the stepping motor through a power driver circuit (not shown) such that its rotor will move to the start angle A.

The angle address calculator 15 updates the pointer register 16 with a new angle address value that is calculated by adding an address increment given by the acceleration constant calculator 14 to the current angle address held in the pointer register 16. The address increment represents an angular increment $\alpha$, and thus the pointer register 16 receives a new angle address representing a new angle B (=A+$\alpha$). The duty cycle selector 19 uses this new angle address in the pointer register 16 to retrieve another set of duty cycles corresponding to the angle B from the duty cycle memory 18 and writes them into the duty cycle registers 20 and 21. The first and second PWM pulse generators 22 and 23 read those new duty cycles to produce pulse signals having the given duty cycles. The resulting pulse signals drive the stepping motor from angle A to angle B.

As can be seen from the above, the angle address calculator 15 adds an address increment to the angle address in the pointer register 16 at each iteration. The rotation angle of the stepping motor thus increases by an angular increment $\alpha$ each time, meaning that the stepping motor rotates at that rate.

The revolution detector 17 determines whether the stepping motor has rotated one revolution, by comparing the angle address (including the start angle A) held in the pointer register 16 with the end angle Z. As described above, the angle address calculator 15 increments the angle address in the pointer register 16 by an address increment representing an angular increment α. Think of the Nth iteration, for example. The angle address calculator 15 updates the pointer register 16 with a new angle address representing a new angle A+Nα, and the revolution detector 17 thus compares this A+Nα with the end angle Z. If these angles coincide with each other, the revolution detector 17 sees it as an indication of one revolution of the stepping motor. If this is the case, then the revolution detector 17 signifies the detection results by sending a signal to the count trigger generator 13.

Upon receipt of the detection result signal, the count trigger generator 13 sends a trigger signal to the acceleration constant calculator 14. The acceleration constant calculator 14 responds to that trigger signal by changing (i.e., increasing or decreasing) the angular increment α depending on whether the stepping motor is supposed to accelerate or decelerate.

Specifically, to accelerate the stepping motor, the acceleration constant calculator 14 adds 2α to the current increment, thus providing the angle address calculator 15 with a triple increment 3α. The angle address calculator 15 initializes the angle after the angle address for the last angle A+Nα (=Z) is written into the pointer register 16. That is, the rotation angle indicated by the pointer register 16 goes back to the start angle A in the next cycle. After that, the angle address calculator 15 adds the increased address increment representing 3α to the current angle address, thus creating a new angle address representing A+3α for the pointer register 16. The angle is increased in this way by 3α at a time. On the other hand, to decelerate the stepping motor, the acceleration constant calculator 14 decreases the angular increment α.

The stepping motor controller 10 translates rotation angle controlled in the way described above into specific duty cycles and sets them to the duty cycle registers 20 and 21. The first and second PWM pulse generators 22 and 23 generate pulse signals having those duty cycles read out of the registers, thus driving the stepping motor to the desired angle. Finally, the stepping motor controller 10 decelerates and stops the stepping motor, thus notifying the CPU of the completion by sending a control end signal from the acceleration control starter 11.

To summarize the above discussion, the proposed stepping motor controller has an angle address register 12 to store angle addresses representing start and end angles. It also has a duty cycle memory 18 to store duty cycles calculated previously for each angle address. The controller has an acceleration control starter to initialize a pointer register with a given start angle address upon receipt of a control start signal. A duty cycle selector looks up this memory to select specific duty cycles corresponding to the angle address held in the pointer register. The stepping motor is driven with pulse signals that a pulse generator produces according to the selected duty cycles. An angle address calculator adds a given address increment to the pointer register. A revolution detector detects one revolution of the stepping motor by comparing the angle address of the pointer register with an end angle address. An acceleration constant calculator changes the angular increment upon detection of one revolution by the revolution detector. This structure of a stepping motor controller alleviates the CPU burden of motor control tasks while enabling smooth acceleration and deceleration of a stepping motor.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for controlling a stepping motor, comprising:
    an angle address register storing a start angle address representing a start angle of the stepping motor, as well as an end angle address representing an end angle of the stepping motor;
    a pointer register holding an angle address representing a rotation angle of the stepping motor;
    an acceleration control starter that initializes the pointer register with the start angle address stored in the angle address register upon receipt of a control start signal;
    a duty cycle memory storing duty cycles corresponding to different angle addresses including the start angle address stored in the angle address register;
    a duty cycle selector that looks up the duty cycle memory to select duty cycles corresponding to the angle address held in the pointer register;
    a pulse generator that produces pulse signals having the duty cycles selected by the duty cycle selector to drive the stepping motor;
    an angle address calculator that updates the pointer register with a new angle address calculated by adding a given address increment to the angle address held in the pointer register;
    a revolution detector that detects one revolution of the stepping motor by comparing the angle address of the pointer register with the end angle address and produces a detection result signal indicating the detection of one revolution of the stepping motor;
    a count trigger generator that generates a trigger signal based on the detection result signal from the revolution detector; and
    an acceleration constant calculator that changes the address increment each time the trigger signal is received from the count trigger generator.

2. The apparatus according to claim 1, wherein the acceleration control starter produces a signal indicating completion of control when the stepping motor has stopped.

3. The apparatus according to claim 1, wherein the duty cycle memory stores duty cycles previously calculated for angle addresses between the start angle address and end angle address stored in the angle address register.

4. A method of controlling a stepping motor, comprising:
    providing an angle address register storing a start angle address representing a start angle of the stepping motor, as well as an end angle address representing an end angle of the stepping motor;
    providing a pointer register holding an angle address representing a rotation angle of the stepping motor;
    providing a duty cycle memory storing duty cycles corresponding to different angle addresses including the start angle address stored in the angle address register;
    initializing the pointer register with the start angle address stored in the angle address register upon receipt of a control start signal;
    looking up the duty cycle memory to select duty cycles corresponding to the angle address held in the pointer register;
    producing pulse signals having the selected duty cycles to drive the stepping motor;
    updating the pointer register with a new angle address calculated by adding a given address increment to the angle address held in the pointer register;

detecting one revolution of the stepping motor by comparing the angle address of the pointer register with the end angle address;

generating a trigger signal based on a detection result signal indicating the detection of one revolution of the stepping motor; and changing the address increment each time the trigger signal is generated.

5. The method according to claim 4, further comprising the step of producing a signal indicating completion of control when the stepping motor has stopped.

6. The method according to claim 4, wherein the duty cycle memory stores duty cycles previously calculated for angle addresses between the start angle address and end angle address stored in the angle address register.

7. A stepping motor control system comprising:

(a) a central processing unit (CPU) that produces a control start signal;

(b) a stepping motor controller comprising:

an angle address register storing a start angle address representing a start angle of the stepping motor, as well as an end angle address representing an end angle of the stepping motor, a pointer register holding an angle address representing a rotation angle of the stepping motor, an acceleration control starter that initializes the pointer register with the start angle address stored in the angle address register upon receipt of a control start signal, a duty cycle memory storing duty cycles corresponding to different angle addresses including the start angle address stored in the angle address register, a duty cycle selector that looks up the duty cycle memory to select duty cycles corresponding to the angle address held in the pointer register, a pulse generator that produces pulse signals having the duty cycles selected by the duty cycle selector to drive the stepping motor, an angle address calculator that updates the pointer register with a new angle address calculated by adding a given address increment to the angle address held in the pointer register, a revolution detector that detects one revolution of the stepping motor by comparing the angle address of the pointer register with the end angle address and produces a detection result signal indicating the detection of one revolution of the stepping motor, a count trigger generator that generates a trigger signal based on the detection result signal from the revolution detector, and an acceleration constant calculator that changes the address increment each time the trigger signal is received from the count trigger generator; and (c) a stepping motor driven with the pulse signals.

8. The stepping motor control system according to claim 7, wherein the acceleration control starter produces a signal indicating completion of control when the stepping motor has stopped.

9. The stepping motor control system according to claim 7, wherein the duty cycle memory stores duty cycles previously calculated for different angle addresses between the start angle address and end angle address stored in the angle address register.

* * * * *